United States Patent
Kelly

(10) Patent No.: US 8,126,310 B2
(45) Date of Patent: Feb. 28, 2012

(54) PLAYBACK DEVICE AND METHOD FOR PROVIDING FUNCTIONALITY BASED ON EVENT INFORMATION RETRIEVED FROM A PLAYLIST

(75) Inventor: Declan Patrick Kelly, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 1297 days.

(21) Appl. No.: 10/575,426

(22) PCT Filed: Oct. 7, 2004

(86) PCT No.: PCT/IB2004/052019
§ 371 (c)(1),
(2), (4) Date: Apr. 10, 2006

(87) PCT Pub. No.: WO2005/036556
PCT Pub. Date: Apr. 21, 2005

(65) Prior Publication Data
US 2007/0022463 A1     Jan. 25, 2007

(30) Foreign Application Priority Data
Oct. 13, 2003   (EP) .................................. 03103781

(51) Int. Cl.
*H04N 9/80* (2006.01)
(52) U.S. Cl. .......................... 386/240; 386/248
(58) Field of Classification Search ............... 386/46, 386/83, 124–126, 239, 240, 248
See application file for complete search history.

(56) References Cited

U.S. PATENT DOCUMENTS

| | | | |
|---|---|---|---|
| 6,052,508 A | 4/2000 | Mincy et al. | |
| 6,275,222 B1* | 8/2001 | Desain | 715/202 |
| 7,346,920 B2* | 3/2008 | Lamkin et al. | 725/112 |
| 7,383,509 B2* | 6/2008 | Foote et al. | 715/731 |
| 2002/0054543 A1 | 5/2002 | Terasaka et al. | |
| 2003/0063217 A1* | 4/2003 | Smith | 348/460 |
| 2003/0084441 A1* | 5/2003 | Hunt | 725/32 |
| 2003/0161615 A1* | 8/2003 | Tsumagari et al. | 386/95 |
| 2003/0189668 A1* | 10/2003 | Newnam et al. | 348/468 |
| 2003/0229679 A1* | 12/2003 | Yoo et al. | 709/217 |
| 2003/0229899 A1* | 12/2003 | Thompson et al. | 725/87 |
| 2004/0047588 A1* | 3/2004 | Okada et al. | 386/46 |
| 2004/0175154 A1* | 9/2004 | Yoon et al. | 386/96 |
| 2006/0146660 A1* | 7/2006 | Ikeda et al. | 369/30.13 |

FOREIGN PATENT DOCUMENTS

| | | | |
|---|---|---|---|
| EP | 752675 | * | 8/1997 |
| EP | 1251514 | * | 10/2002 |
| EP | 1309205 | * | 7/2003 |
| JP | 2001266487 A | | 9/2001 |
| JP | 2002369154 A | | 12/2002 |
| WO | 2004077436 A1 | | 9/2004 |

OTHER PUBLICATIONS

ISR: PCT/IB04/052019.
Written Opinion: PCT/IB04/052019.

* cited by examiner

*Primary Examiner* — David Harvey

(57) ABSTRACT

Instead of using events stored in the datastream itself, applications can retrieve event information from the playlist on a record carrier such as DVD and blu-disc. By retrieving the event information from the playlist changes in the event information do not require reprocessing of the data stream. In addition the application knows before the start of the playback of the data stream where the events are located and what functionality in terms of resources is required. A better scheduling of resources is thus possible.

16 Claims, 4 Drawing Sheets

PLAYBACK DEVICE AND METHOD FOR PROVIDING FUNCTIONALITY BASED ON EVENT INFORMATION RETRIEVED FROM A PLAYLIST

The invention relates to a playback device for retrieving a data stream comprising video data comprising a java processor for processing an application, the java processor comprising an input for receiving an event information, to a Java processor for processing an application, the java processor comprising an input for receiving an event information and to a method for processing an java application.

Such a playback device is known from set top boxes complying with the MHP standard.

Such set topbox comprises a processor for processing an application, for instance a Java application.

The Java application provides a functionality to the set top box that is related to the data stream being played back by the set top box. For this the java application receives an event from the MHP video stream that indicates to the Java application that a certain position in the stream of video information is reached and that the associated functionality is to be provided by the Java application.

The event is stored in the video stream as a DSM-CC stream event.

Storing the event in the stream has the disadvantage that the stream must be reprocessed if an event is to be changed.

It is an object of the invention to provide a method that allows changes to the events without extensive processing of the data stream and while still being able to provide event information at the appropriate position during playback of the video or audio data.

To achieve this objective the method is characterized in that the event information is retrieved from a playlist of the data stream.

By retrieving the event information from the play list that is associated with the data stream comprising video or audio data the event information is no longer retrieved from the data stream comprising the video or audio data. Since the event information is not comprised in the data stream, reprocessing of the data stream is not required and the data stream can remain unchanged when the event information is changed. In addition, by retrieving the event information from the play list a timing correlation between the playback of the video or audio information in the data stream and the event information can be established. The playlist provides the playback device with information about when sections of the video or audio stream are to be played back. For instance a chapter mark indicating the start of a chapter can be used to activate functionality provided by a Java application that is related to this chapter. In this way the functionality associated to a chapter can be provided at the right moment, i.e. coordinated with the start of the playback of that chapter.

Changing event information requires the reprocessing of the playlist, which results in substantially less processing compared to the situation where the data stream must be reprocessed to change event information. In addition the playback device benefits from having the event information in the playlist because it no longer needs to demultiplex the event information from the data stream, reducing the required processing resources. An additional advantage is that the playback device is aware of the event information before the event arrives, because the playlist is retrieved before the events happen, and can thus schedule the launch of applications much better by anticipating the need to start the application and the anticipated processor work load at the moment of the start of the application and at the moment the event is reached during playback.

Hence the event information retrieved from the playlist allows the same functionality to be implemented as event information stored in the data stream itself, while avoiding the reprocessing of the data stream in order to change the event information. The object of the invention is consequently achieved.

An embodiment of the method is characterized in that the playlist comprises a mark with a presentation time and that the event information is information that the playback device reached the mark presentation time during playback.

The application needs to know when the functionality is to be provided.

The event information is retrieved from the playlist before the event is reached.

The application, now in the possesion of the event information subsequently monitors the progress of the playback and provide the functionality when the playback has progressed to the point indicated in the playlist. The application then provides the functionality associated with the event.

Alternatively the event information can be provided to the application only at the moment the application must provide the functionality. The processor in the playback device retrieves event information from the playlist and only provides the event information to the application when the processor determines that the playback reached that point in the data stream corresponding to the event information in the playlist. Thus a regular application can be used. The application does not need to monitor the progress of the playback of the data stream but relies on other processes running on the processor to monitor the play back of the data stream. Especially in the case of Java applications this is an advantage because the Java application does not need to be aware of lower level processes in the playback device and can be kept independent of the underlying hardware.

A playback device according to the invention is characterized in that the event information is received from a playlist of the data stream.

By retrieving the event information from the play list that is associated with the data stream comprising video or audio data the playback no longer retrieves the event information from the data stream comprising the video or audio data. Since the event information is no longer comprised in the data stream, reprocessing of the data stream is not required and the data stream can remain unchanged when the event information is changed. In addition, by retrieving the event information from the play list a timing correlation between the playback of the video or audio information in the data stream and the event information can still be established. The playlist provides the playback device with information about when sections of the video or audio stream are to be played back. For instance a chapter mark indicating the start of a chapter can be used to activate functionality provided by a Java application that is related to this chapter.

In this way the functionality associated to a chapter can be provided at the right moment, i.e. coordinated with the start of the playback of that chapter.

Changing event information requires the reprocessing of the playlist only, which results in substantially less processing compared to the situation where the data stream must be reprocessed to change event information. In addition the playback device benefits from having the event information in the playlist because it no longer needs to demultiplex the event information from the data stream, reducing the required processing resources. An additional advantage is that the playback device is aware of the event information before the event arrives, because the playlist is retrieved before the events happen, and can thus schedule the launch of applications much better by anticipating the need to start the application and the anticipated processor work load at the moment of the start of the application and at the moment the event is reached during playback.

Hence by retrieving the event information from the playlist the playback device is able to provide the same functionality as when the event information is stored in the data stream itself, while avoiding the reprocessing of the data stream in order to change the event information.

The object of the invention is consequently achieved.

An embodiment of the playback device is characterized in that the java processor comprises means for providing the event information to the application.

The application needs to know when the functionality is to be provided.

The event information is retrieved from the playlist before the event is reached.

The application, now in the possesion of the event information subsequently monitors the progress of the playback and provide the functionality when the playback has progressed to the point indicated in the playlist. The application then provides the functionality associated with the event.

Alternatively the event information can be provided to the application only at the moment the application must provide the functionality. The processor in the playback device retrieves event information from the playlist and only provides the event information to the application when the processor determines that the playback reached that point in the data stream corresponding to the event information in the playlist. Thus a regular application can be used. The application does not need to monitor the progress of the playback of the data stream but relies on other processes running on the processor to monitor the play back of the data stream. Especially in the case of Java applications this is an advantage because the Java application does not need to be aware of lower level processes in the playback device and can be kept independent of the underlying hardware.

A further embodiment of the playback device is characterized in that the playlist comprises a mark with a presentation time and that the event information is information that the playback device reached the mark presentation time during playback. A mark can have a presentation time which is the time in the playback of the data stream when the presentation of a section of the data stream commences or stops.

This an event. A functionality can be associated with this event. An application is used to provide this functionality.

A further embodiment of the playback device is characterized in that the mark is a chapter mark or a skip mark or a link mark.

Chapter marks, skip marks and link marks are already defined in the playlist.

It can be beneficial to provide functionality through a Java application to the user when a new chapter on the record carrier starts, or ends. For instance when an interactive record carrier complying with the DVD or blu-disk standard reaches a new chapter, the functionality may include displaying an interactive menu specially tailored to the video content of the chapter reached. Similar functionality may be provided in association to the skip mark or the link mark.

A further embodiment of the playback device is characterized in that the mark is reserved for use by the application Special marks may be inserted in the playlist The special marks are not recognized by the playback device as regular playlist entries and thus current playback devices that do not comprise this invention can still correctly playback the information on the record carrier. Playbck devices comprising the present invention recognize the special marks and provide the special marks to the Java application. All advantages of storing the event information in marks in the playlist as discussed above are maintained when special marks are placed in and retrieved from the playlist while compatibility with the existing playback devices is maintained as well.

A further embodiment of the playback device is characterized in that the mark comprises further information for the application.

Application information may be appended to the mark. In that case the event information is derived from the mark itself while in addition the application information is provided to the application started by the event information.

This allows more flexibility and more customization of the functionality provided by the application. Because current playback devices do not recognize the additional information the additional information is ignore during playback and compatibility of a record carrier comprising additional information in the playlist for existing marks is achieved.

A Java processor according to the invention is characterized in that the event information is received from a playlist of a video stream.

By retrieving the event information from the play list that is associated with the data stream comprising video or audio data the playback no longer retrieves the event information from the data stream comprising the video or audio data. Since the event information is no longer comprised in the data stream, reprocessing of the data stream is not required and the data stream can remain unchanged when the event information is changed. In addition, by retrieving the event information from the play list a timing correlation between the playback of the video or audio information in the data stream and the event information can still be established. The playlist provides the playback device with information about when sections of the video or audio stream are to be played back. For instance a chapter mark indicating the start of a chapter can be used to activate functionality provided by a Java application that is related to this chapter.

In this way the functionality associated to a chapter can be provided at the right moment, i.e. coordinated with the start of the playback of that chapter.

Changing event information requires the reprocessing of the playlist only, which results in substantially less processing compared to the situation where the data stream must be reprocessed to change event information. In addition the playback device benefits from having the event information in the playlist because it no longer needs to demultiplex the event information from the data stream, reducing the required processing resources. An additional advantage is that the playback device is aware of the event information before the event arrives, because the playlist is retrieved before the events happen, and can thus schedule the launch of applications much better by anticipating the need to start the application and the anticipated processor work load at the moment of the start of the application and at the moment the event is reached during playback.

Hence by retrieving the event information from the playlist the playback device is able to provide the same functionality as when the event information is stored in the data stream itself, while avoiding the reprocessing of the data stream in order to change the event information. The object of the invention is consequently achieved.

The invention will now be described based on figures.

Figure 1:
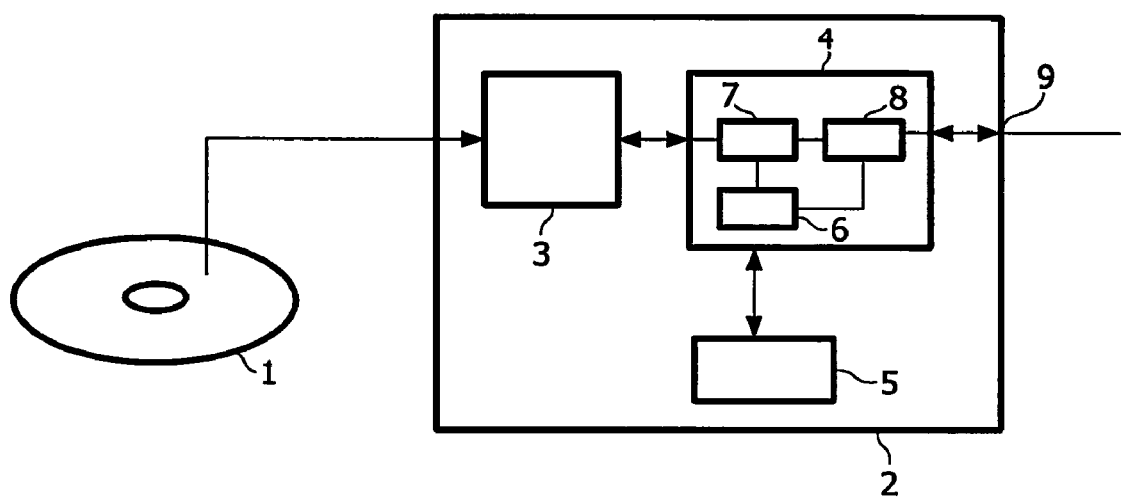
FIG. 1 shows a playback device comprising a java processor.

The playback device 2 is arranged for retrieving data, comprising a data stream, from the record carrier 1. The record carrier can be a DVD or a Blu-disk or any other record carrier comprising a data stream comprising video information and a playlist. The playback device comprises a basic engine 3 for retrieving the data form the record carrier 1. The basic engine 3 is connected to a processor 4 via a bidirectional interface. The processor can, via the bidirectional interface, instruct the basic engine to retrieve data from locations on the record carrier 1 indicated by the processor 4. The processor 4 can thus instruct the basic engine 3 to retrieve a playlist from the record carrier 1 and to retrieve data comprising a data stream, or sections there of, from the record carrier 1. After the processor 4 received the playlist from the basic engine 3, the processor 4 retrieves event information form the playlist in a first section 7 of the processor 4 and monitors whether the playback of the record carrier reached the location of one of the events retrieved from the playlist. When the playback reaches the location of an event the first section of the processor provides the event information to a second section 6 of the processor that is used to run an application for providing a certain functionality when the location of a certain event is reached during playback. The application run by the second section 6 of the processor receives the event information and provides a functionality for instance in the form of video information to be displayed on a television set or monitor coupled to the playback device 2. In order to provide the functionality the second section 6 provides, in the example of video information, the video information to an output means 8 in the processor. The output means 8 provides the received video information obtained from the second section 6 to an output 9 of the playback device 2. The output 9 is connected to a television set or a monitor for viewing the video information.

The first section 7 comprises monitoring means to monitor the progress of the playback of the video information but can also comprise the decoding of the video information. The first section is in that case also coupled to the output means 8 in order to provide the video information to the output 9 of the playback device 2.

The output device can consequently, if provided with the video information of the functionality provided by the application and the video information obtained from decoding the video information in the data stream, output both at the same time, for instance by providing the video information from the data stream full screen and inserting the video information associated to the functionality provided by the application that received the event information into video information from the data stream. In case the functionality associated with the event provided by the application is a menu, the playback of the video information from the data stream can be halted until a choice from the menu is made. The menu can in that case be full screen and the video information from the data stream can be suppressed.

Figure 2:
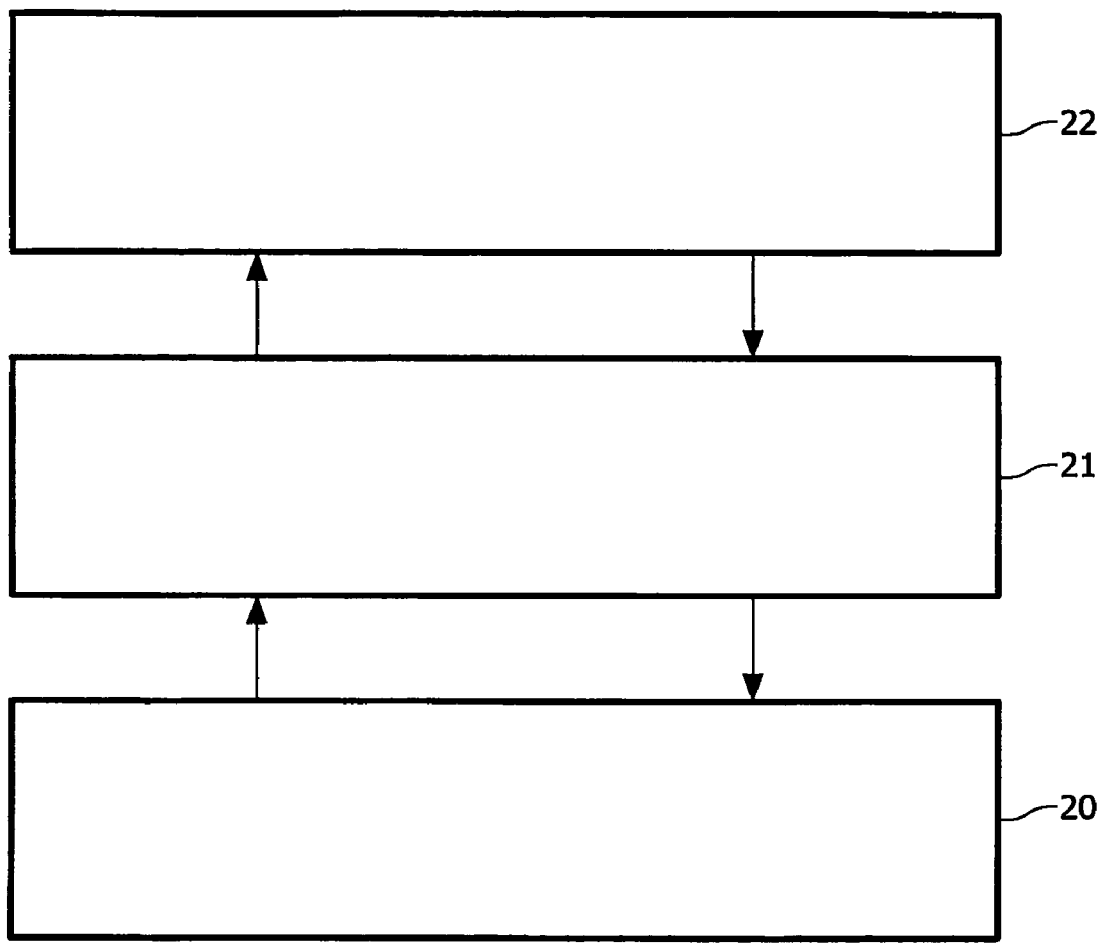
FIG. 2 shows the application layers.

FIG. 2 shows the application layers.

The hardware layer 20 is made independent of the top application layer 22 by an intermediate layer 21. Instructions from the top application layer, for instance a Java application are provided to the intermediate layer 21. The intermediate layer 21 translated the instructions for the hardwrae layer 20, thus allowing the top application layer to be completely independent of the hardware layer 20.

Figure 3:
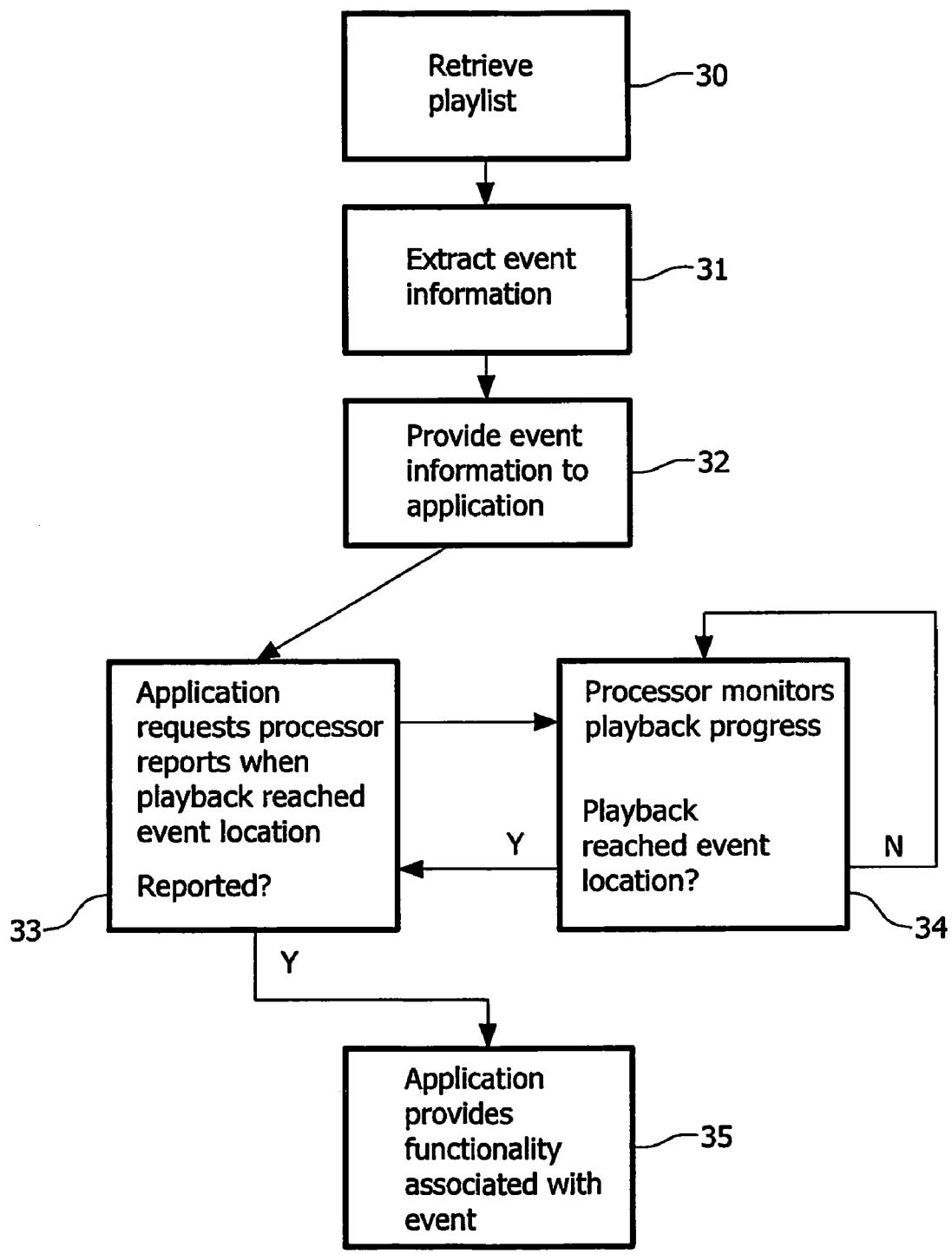
FIG. 3 shows a flow chart of the method where the top level application layer monitors the progress of the playback of the data stream.
Figure 4:
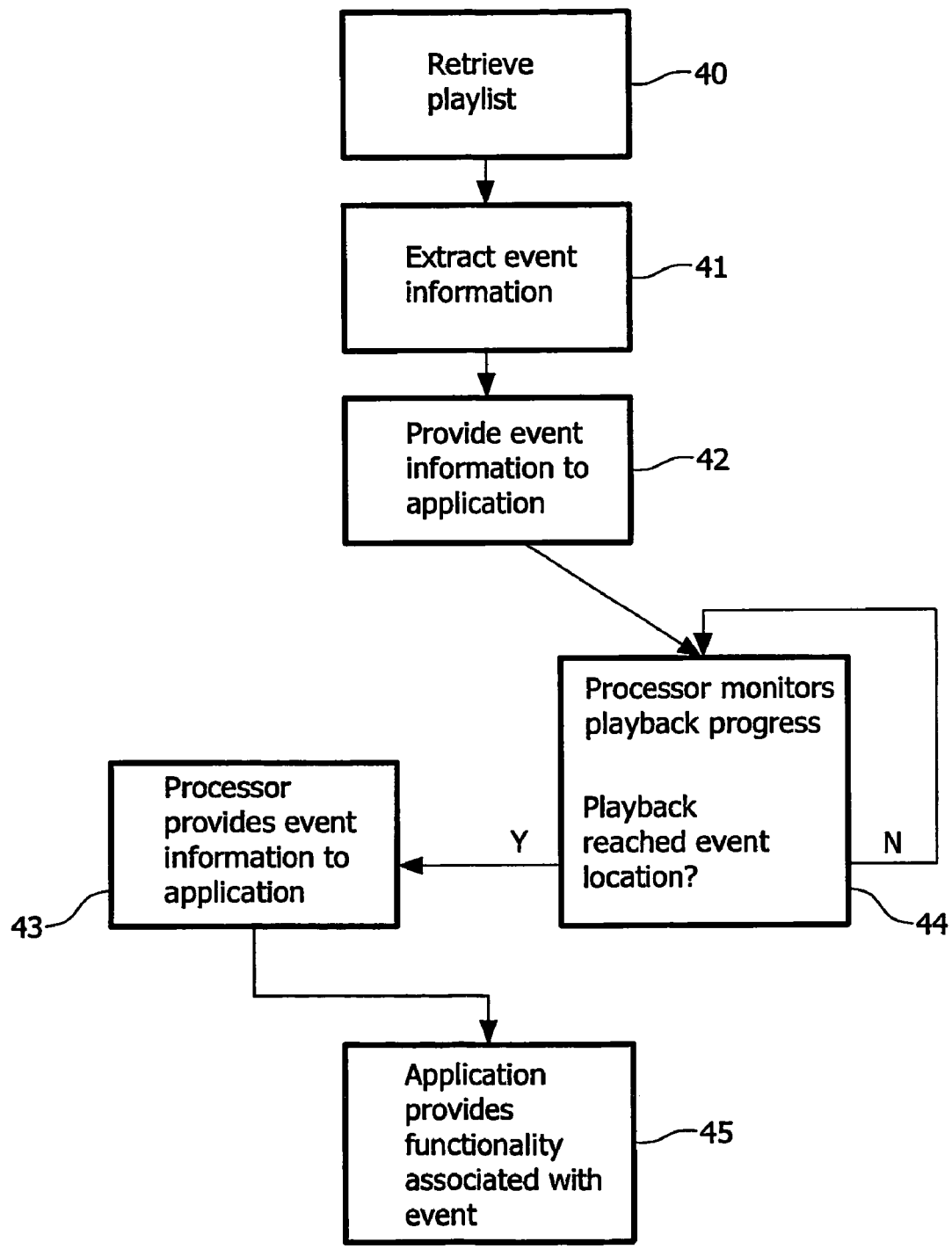
FIG. 4 shows a flow chart of another embodiment of the method where the intermediate layer monitors the progress of the playback of the data stream.

As explained in FIGS. 3 and 4 there are two alternative solutions for handling the event information.
- the top application layer 22 monitors the progress of the playback of the data stream
- the intermediate layer 21 monitors the progress of the playback of the data stream.

When the top application layer 22 monitors the progress of the playback of the data stream the top application layer 22 requests retrieval of the playlist from the record carrier. This request, given to the intermediate layer 21 is translated and the intermediate layer 21 requests the retrieval of the playlist by the hardware layer 20.

The hardware layer 20 retrieves the playlist from the recording medium and provides the playlist to the intermediate layer 21. The intermediate layer 21 than then translates the playlist into the correct format for the top application layer 22. The top application layer 22 processes the playlist and retrieves the event information. Based on the event information the top application level 22 starts monitoring the progress of the playback by requesting playback progress status reports from the intermediate layer 21, which in turn request these playback progress status reports from the hardware layer 20. Once a playback progress status report is received, from the hardware layer 20 through the intermediate layer 21, indicating that the playback has progressed to the point in the data stream associated with the event derived from the event information, the top level application starts providing the functionality associated with the event.

When the intermediate layer 21 monitors the progress of the playback of the data stream the intermediate layer 21 requests retrieval of the playlist from the record carrier. The intermediate layer 21 requests the retrieval of the playlist by the hardware layer 20. The hardware layer 20 retrieves the playlist from the recording medium and provides the playlist to the intermediate layer 21. The intermediate layer 21 than extracts the event information from the playlist. Based on the event information the intermediate level 21 starts monitoring the progress of the playback by requesting playback progress status reports from the hardware layer 20. Once a playback progress status report is received indicating that the playback has progressed to the point in the data stream associated with the event derived from the event information, the intermediate level 21 provides the event information to the top level application 22 which can then in turn start providing the functionality associated with the event.

FIG. 3 shows a flow chart of the method where the top level application layer monitors the progress of the playback of the data stream.

In a first step 30, the top level application requests the retrieval of the playlist. Once the playlist is retrieved the event information is extracted from the playlist in a second step 31. The event information is then provided to the top level application in a third step 32. Subsequently the top level application, in a fourth step 33, requests the processor, i.e. as explained an intermediate level application running on the processor, to monitor the progress of the playback of the data stream. This intermediate level application running on the processor monitors, in a fifth step 34, the progress of the playback of the data stream in a fifth step comprising a loop. The intermediate level application checks whether the playback has progressed to a certain point. If the playback has not reached the event location the intermediate application continues to monitor.

If the playback reached the event location a report is issued in the fifth step 34 to the top level application, the operation of the fourth step 33 continuing from this point and advancing to the sixth step 35 where the application starts providing the functionality associated with the event. Thus the event information provided in this case is the location of the event. The top level application is aware of the monitoring of the playback and is waiting, expecting a trigger in the form of information about the status of the playback from another application that actually performs the monitoring.

FIG. 4 shows a flow chart of another embodiment of the method where the intermediate layer monitors the progress of the playback of the data stream.

In a first step 40 the top level application requests the retrieval of the playlist.

Once the playlist is retrieved the event information is extracted from the playlist in a second step 41. The event information is then provided to the an intermediate level application in a third step 42. Subsequently the intermediate level application, running on the processor starts monitoring the progress of the playback of the data stream. The monitoring of the progress of the playback of the data stream in the fourth step 44 comprises a loop. The intermediate level application checks whether the playback has progressed to a certain point. If the playback has not reached the event location the intermediate application continues to monitor.

If the playback reached the event location a report comprising the event information retrieved from the playlits is issued in the fifth step 43 to the top level application. The method then advances to the sixth step 45 where the application starts providing the functionality associated with the event. Thus the event information provided in this case is the actual reaching of the event by the playback. The top level application is not aware of the monitoring of the playback but gets a trigger in the form of the event information from another application that actually performs the monitoring.

A possible syntax for implementing the invention is shown below.

| Proposed New Syntax | | |
|---|---|---|
| Syntax | No. of bits | Mnemonic |
| JavaPlayListMark( ) { | | |
|     Length | 32 | uimsbf |
|     number_of_PlayList_marks | 16 | uimsbf |
|     for(i=0; i < number_of_PlayList_marks; i++) { | | |
|         Reserved | 8 | bslbf |
|         mark_type | 8 | uimsbf |
|         ref_to_PlayItem_id | 16 | uimsbf |
|         mark_time_stamp | 32 | uimsbf |
|         entry_ES_PID | 16 | uimsbf |
|         Duration | 32 | uimsbf |
|     Data_Bytes | 8*16 | Uimsbf |
|     } | | |
| } | | |

In this example the Data_Bytes allows 16 bytes of data, this number is an example, less is sufficient for most cases.

| Value | Meaning | Note |
|---|---|---|
| 0x00 | Reserved for future use | |
| 0x01 | Chapter-mark | See section X.X.X of application images. The duration field shall be set to zero. The entry_ES_PID shall be set to 0xFFFF. Data_Bytes are not defined in this case |
| 0x02 | Skip point | See section X.X.X of application images. The duration field shall be set to zero. The entry_ES_PID shall be set to 0xFFFF. Data_Bytes are not defined in this case |
| 0x03 | Link point | A mark referenced by a navigation command such as Link MK. When the player encounters a Link point in the process of a User Operation such as Chapter Skip, the player simply ignores the mark. The duration field shall be set to zero. The entry_ES_PID shall be set to 0xFFFF. Data_Bytes are not defined in this case |
| 0x04-0x2F | Java Marks | A mark used by a Java Application |
| 0x30-0xFF | Reserved for future use | |

In this example, mark values from 0x04 to 0x2F are defined as Java marks.

The table below show the current definitions of marks that can be used as event information in the playlist. It also shows the values that are reserved for future use and that consequently can be used for the present invention.

| Mark Tables from BD-ROM Draft Spec | | |
|---|---|---|
| Syntax | No. of bits | Mnemonic |
| PlayListMark( ) { | | |
|     Length | 32 | uimsbf |
|     number_of_PlayList_marks | 16 | uimsbf |
|     for(i=0; i < number_of_PlayList_marks; i++) { | | |
|         Reserved | 8 | bslbf |
|         mark_type | 8 | uimsbf |
|         ref_to_PlayItem_id | 16 | uimsbf |
|         mark_time_stamp | 32 | uimsbf |
|         entry_ES_PID | 16 | uimsbf |
|         Duration | 32 | uimsbf |
|     } | | |
| } | | |

| Value | Meaning | Note |
|---|---|---|
| 0x00 | Reserved for future use | |
| 0x01 | Chapter-mark | See section X.X.X of application images. The duration field shall be set to zero. The entry_ES_PID shall be set to 0xFFFF. |
| 0x02 | Skip point | See section X.X.X of application images. The duration field shall be set to zero. The entry_ES_PID shall be set to 0xFFFF. |
| 0x03 | Link point | A mark referenced by a navigation command such as Link MK. When the player encounters a Link point in the process of a User Operation such as Chapter Skip, the player simply ignores the mark. The duration field shall be set to zero. The entry_ES_PID shall be set to 0xFFFF. |
| 0x03-0xFF | Reserved for future use | |

The invention claimed is:

1. A playback device for retrieving a data stream comprising video data, the playback device comprising:
   a processor configured to receive event information from a playlist of the data stream; and
   an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the playlist comprises a mark with a presentation time and wherein the event information is information that the playback device reached the mark during playback, wherein the mark is a chapter mark or a skip mark.

2. The playback device as claimed in claim 1, wherein the mark is reserved for use by the application.

3. The playback device as claimed in claim 2, wherein the mark comprises further information for the application.

4. A method for processing a data stream and event information associated with the data stream, the method comprising the acts of:
   starting playback of the data stream comprising video information or audio information by a playback device;
   retrieving by a processor of the playback device the event information from a playlist of the data stream; and
   providing the event information to an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the playlist comprises a mark with a presentation time and that the event information is information that the playback device reached the mark during playback, wherein the mark is a chapter mark or a skip mark.

5. A playback device for retrieving a data stream comprising video data, the playback device comprising:
   a processor configured to receive event information from a playlist of the data stream; and
   an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the processor is further configured to establish timing correlation between playback of the data stream and the event information retrieved from the playlist, wherein the mark is a chapter mark or a skip mark.

6. A playback device for retrieving a data stream comprising video data, the playback device comprising:
   a processor configured to receive event information from a playlist of the data stream; and
   an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the event information provides the playback device with timing information about when a section of the data stream is to be played back and the processor is further configured to provide the event information to the application in accordance with the timing information for providing the functionality associated with the section in accordance with the timing information, wherein the mark is a chapter mark or a skip mark.

7. The playback device of claim 6, wherein the timing information includes a start of playback of the section, and the processor is configured to provide the event information to the application at the start of the playback of the section so that the application provides the functionality at the start of the playback of the section.

8. A playback device for retrieving a data stream comprising video data, the playback device comprising:
   a processor configured to receive event information from a playlist of the data stream; and
   an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the event information provides the processor with a start time of a section of the data stream to be played back and the processor is further configured to provide the event information to the application at the start time for providing a functionality associated with the section at the start time, wherein the mark is a chapter mark or a skip mark.

9. A playback device for retrieving a data stream comprising video data, the playback device comprising:
   a processor configured to receive event information from a playlist of the data stream; and
   an application for providing functionality associated with the event information;
   wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the processor is configured to retrieve the event information from the playlist before an event associated with the event information is reached during playback of the data stream by the playback device, wherein the mark is a chapter mark or a skip mark.

10. The playback device of claim 9, wherein the processor is configured to monitor a playback of the data stream and provide the event information to the application when the event is reached during the playback for providing the functionality associated with the event when the event is reached during the playback.

11. A playback device for retrieving a data stream comprising video data, the playback device comprising:
a processor configured to receive event information from a playlist of the data stream; and
an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the application is configured to provide the functionality only when a playback of the data stream reached the point in the data stream corresponding to the event information, wherein the mark is a chapter mark or a skip mark.

12. A playback device for retrieving a data stream comprising video data, the playback device comprising:
a processor configured to receive event information from a playlist of the data stream; and
an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the processor is configured to monitor playback of the data stream for providing the application with the event information only when the playback reached the point in the data stream corresponding to the event information so that the functionality is provided by the application at the point without monitoring the playback by the application, wherein the mark is a chapter mark or a skip mark.

13. A method for processing a data stream and event information associated with the data stream, the method comprising the acts of:
starting playback of the data stream comprising video information or audio information by a playback device;
retrieving by a processor of the playback device the event information from a playlist of the data stream; and
providing the event information to an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the processor retrieves the event information from the playlist before an event associated with the event information is reached during the playback of the data stream by the playback device, wherein the mark is a chapter mark or a skip mark.

14. A method for processing a data stream and event information associated with the data stream, the method comprising the acts of:
starting playback of the data stream comprising video information or audio information by a playback device;
retrieving by a processor of the playback device the event information from a playlist of the data stream; and
providing the event information to an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the processor monitors the playback of the data stream for providing the application with the event information only when the playback reached the point in the data stream corresponding to the event information so that the functionality is provided by the application at the point without monitoring the playback by the application, wherein the mark is a chapter mark or a skip mark.

15. A playback device for retrieving a data stream comprising video data, the playback device comprising:
a processor configured to receive event information from a playlist of the data stream; and
an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the event information from the playlist provides the playback device with timing information about when sections of the data stream are to be played back, and wherein functionality provided by the application and related to the event information is activated at a start of playback of the sections by the playback device, wherein the mark is a chapter mark or a skip mark.

16. A method for processing a data stream and event information associated with the data stream, the method comprising the acts of:
starting playback of the data stream comprising video information or audio information by a playback device;
retrieving by a processor of the playback device the event information from a playlist of the data stream; and
providing the event information to an application for providing functionality associated with the event information;
wherein the playlist is not included in the data stream, and the event information is changeable without changing the data stream, wherein the processor of the playback device retrieves the event information from the playlist and only provides the event information to the application when the processor determines that playback of the data stream reached a point in the data stream corresponding to the event information in the playlist, wherein the event information from the playlist provides the playback device with timing information about when sections of the data stream are to be played back, and wherein functionality provided by the application and related to the event information is activated at a start of playback of the sections by the playback device, wherein the mark is a chapter mark or a skip mark.

* * * * *